May 20, 1958

C. D. STEWART 2,835,459

AUTOMATIC LOCKING DEVICE

Filed Aug. 16, 1954

INVENTOR.
CHARLES D. STEWART
BY
*George C. Sullivan*
Agent

May 20, 1958      C. D. STEWART      2,835,459

AUTOMATIC LOCKING DEVICE

Filed Aug. 16, 1954      3 Sheets-Sheet 2

*INVENTOR.*
CHARLES D. STEWART
BY

*George C. Sullivan*
Agent

May 20, 1958 C. D. STEWART 2,835,459
AUTOMATIC LOCKING DEVICE
Filed Aug. 16, 1954 3 Sheets-Sheet 3

INVENTOR.
CHARLES D. STEWART
BY
George C. Sullivan
Agent

United States Patent Office 2,835,459
Patented May 20, 1958

2,835,459
AUTOMATIC LOCKING DEVICE

Charles D. Stewart, Glendale, Calif., assignor to Lockheed Aircraft Corporation, Burbank, Calif.

Application August 16, 1954, Serial No. 449,888

8 Claims. (Cl. 244—83)

This invention relates, generally, to aircraft control surface actuators and, more particularly, to an automatic locking device adapted to positively lock a control surface, or the like, against movement as urged by external forces applied thereto. The device is operated automatically in the normal course of actuating the control surfaces with no deliberate action required by the pilot or operator.

The principal object of this invention is to provide a device which will automatically prevent movement of aircraft control surfaces due to either gust conditions while the aircraft is on the ground or to disturbing aerodynamic forces while the aircraft is in flight unless the control surface is actuated by movement of the cockpit controls. The airflow characteristics around the wing and empennage structure of high speed aircraft in particular are such that the control surfaces instead of trailing in a zero or neutral position in flight, will often flutter or assume a position materially different from the neutral position. This is an obviously undesirable situation since the pilot is required to continuously apply a force through the control system which will counterbalance the unsymmetrical loads on the control surface. The device described herein obviates the necessity for continuous corrective action on the part of the pilot and automatically holds the control surface in the neutral position. Moreover, if the control surfaces are free to swing while the aircraft is on the ground, gust conditions are apt to cause damage by forcing them violently against their stops. By locking the control surfaces automatically with the device described herein possible damage caused by gust loads is also obviated.

Another object of this invention is to provide an automatic control surface locking device which is completely mechanical in operation and which forms an integral part of the control surface actuating mechanism.

Still another object of this invention is to provide a positive acting, automatic control surface locking device which is operable without deliberate action on the part of the pilot and which is dependable in operation.

Further and other objects will become apparent from a reading of the following description, especially when considered in combination with the accompanying drawing wherein like numerals refer to like parts.

Figure 1:
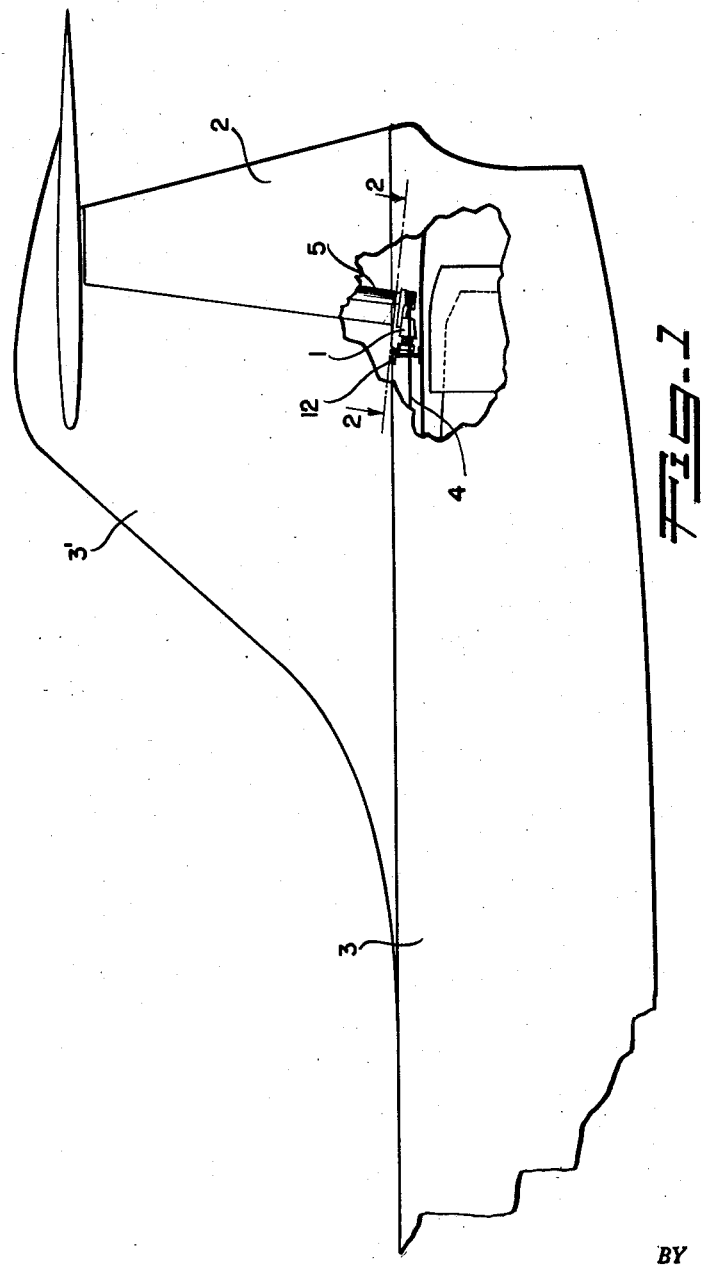
Figure 1 is a fragmentary view of an aircraft incorporating the automatic control surface locking device of this invention in a rudder actuating mechanism.
Figure 2:
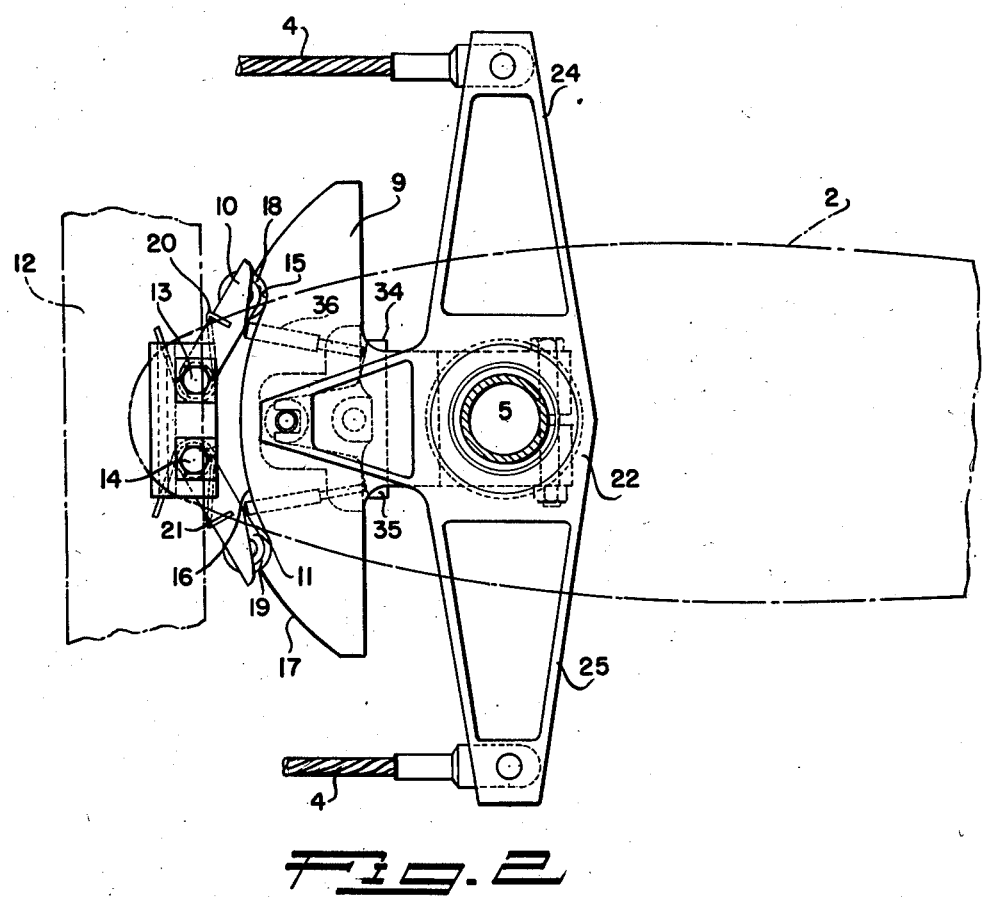
Figure 2 is a sectional view taken on line 2—2 of Figure 1.

The control surface locking device 1 is shown in Figure 1 associated with a rudder 2 of an aircraft 3, for purposes of illustration, it being obvious that the locking device is equally as useful to control any movable panel. Conventional cockpit controls (not shown) for actuating rudder 2 include a cable assembly 4 which connects with locking device 1, as shown in Figure 2, to effect rudder movement from a neutral position to any desired new position within the allowable limits of rudder movement to porduce the required aerodynamic control forces for guiding the aircraft. Rudder 2 is arranged to swing, relative to the vertical tail structure 3', about an axis represented by the centerline of rudder post 5. Post 5 projects below the rudder and into the fuselage portion of aircraft 3 where it engages locking device 1.

Figure 3:
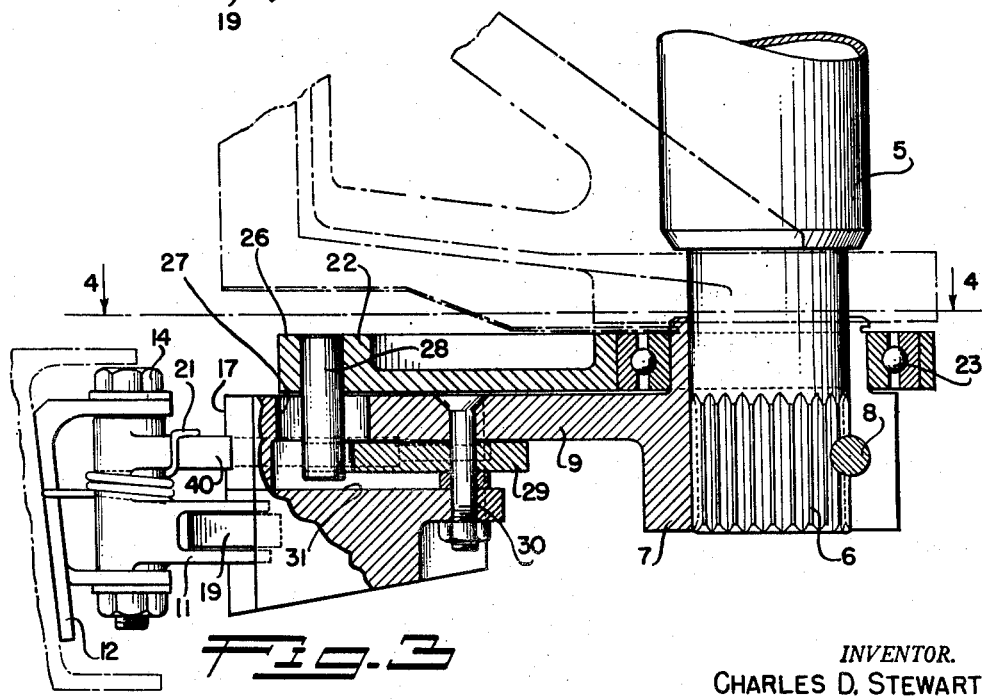
Figure 3 is a fragmentary side elevation view of the automatic control surface locking device.

As best shown in Figure 3, the lower end 6 of post 5 is splined to receive a split sleeve 7 and prevent relative rotation therebetween. A bolt 8 carried by the split sleeve securely fastens the same to the post and prevents relative axial movement therebetween.

Figure 4:
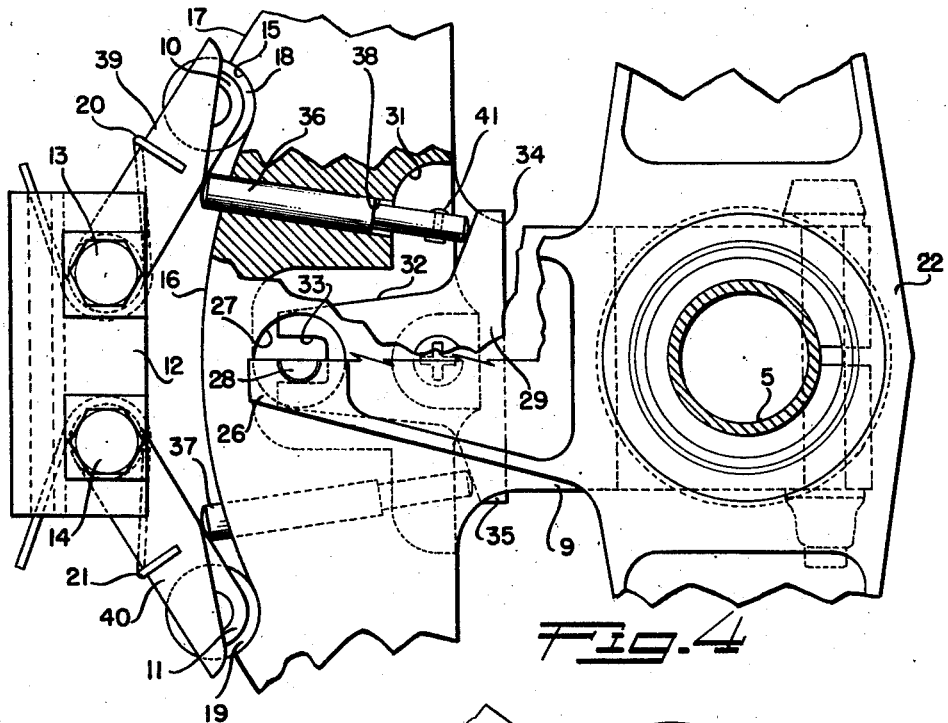
Figure 4 is a fragmentary top elevation view of the automatic control surface locking device taken approximately on line 4—4 of Figure 3.

A cam member 9 formed integral with sleeve 7 extends laterally therefrom and engages a pair of rollers 18 and 19 on arms 10 and 11, as best shown in Figures 2 and 4. Arms 10 and 11 are swingably carried by fixed structure 12 on the aircraft through pins 13 and 14, as best shown in Figure 1. Cam member 9 is provided with a two-level cylindrical cam surface wherein the lower level cam surface 16 is formed by undercutting the upper level cam surface medially thereof by an amount sufficient to seat rollers 18 and 19 in the transition areas 15 between the two levels in such a manner that external forces applied to rudder 2 will be ineffective to unseat the rollers.

Torsion springs 20 and 21 are carried by pins 13 and 14 respectively for urging arms 10 and 11 towards cam member 9, causing rollers 18 and 19 to always engage the cam surface and to restore the device to the locked condition.

A rudder position control arm 22, generally T-shaped in plan form, is rotatably carried on sleeve 7 through bearings 23, as most clearly shown in Figures 3 and 4. Legs 24 and 25 of lever member 22 connect with cockpit control cable assembly 4, as shown in Figure 2, whereby lever member 22 may be caused to rotate about rudder post 5 in either direction by actuation of the cockpit controls. Arm 26 of lever member 22 projects laterally outwardly from sleeve 7 and adjacent cam member 9. An opening 27 formed in cam member 9 is adapted to loosely receive a pin 28 which is secured to arm 26 as best shown in Figure 2. Thus lever member 22 may move relative to cam member 9 about rudder post 5 until pin 28 engages the wall of opening 27 at which time continued rotation of lever member 26 will necessarily effect rotation of cam member 9 and hence rotation of rudder 2, provided, of course, that such continued rotation is allowed by cam locking arms 10 and 11.

Automatic release of cam member 9 by arms 10 and 11 is effected by a bellcrank 29 swingably carried by cam member 9 through pin 30. As best shown in Figure 4, bellcrank 29 is aligned with a recess 31 formed in cam member 9 which communicates with opening 27 and extends in a transverse direction relative to the opening. Leg 32 of bellcrank 29 projects into recess 31 and engages pin 28 on lever member 22 by means of a notch 33 formed in the extreme tip end of leg 32. In this manner limited rotation of bellcrank 29 relative to the cam member is effected by relative movement between lever member 22 and the cam member within the limits allowed by opening 27.

Legs 34 and 35 on bellcrank 29 engage pistons 36 and 37 respectively. The pistons are slidably carried within cam member 9 by hollow cylinder-like openings 38 arranged transversely of cam surface 16 as most clearly shown in Figure 4. Pistons 36 and 37 are of such a length as to project beyond cam surface 16 and engage detents 39 and 40, respectively, which form an integral part of cam locking arms 10 and 11. The purpose of employing detents 39 and 40 is to provide means for engaging pistons 36 and 37 which are laterally disposed from rollers 18 and 19 whereby rotation of cam member 9 may be accomplished without requiring the rollers to engage the pistons since such action would tend to prevent smooth operation of the locking device. Pistons 36 and 37 are retained within openings 38 in cam member 9 by suitable means, such as pins 41, as best shown in Figure 4, and by legs 34 and 35 of bellcrank 29.

Rudder 2 may be swung from its neutral or zero position to a new position producing the desired aerodynamic control on the aircraft by simply pulling on either cable in cable assembly 4 in the conventional manner. This causes rotation of lever member 22 relative to cam member 9 until pin 28 on lever member 22 engages the wall of opening 27. During this initial movement of lever member 22 wherein the latter moves relative to cam member 9, bellcrank 29 is also rotated relative to the cam member whereby piston 36 or 37, depending upon the direction of rotation of lever member 22, is caused to move outwardly and release locking arm 10 or 11 and allow cam member 9 to rotate in response to continued movement of lever member 22. After the aircraft has been maneuvered into the new flight direction by the deflected rudder the pilot simply actuates cable assembly 4 to rotate lever member 22 back towards the neutral position. When rudder 2 reaches the neutral position, both rollers 18 and 19 drop onto the lower level cam surface 16 from the upper level cam surface 17 to again lock the rudder in the neutral position as shown in the drawing. As the rollers move onto the lower level cam surface 16, spring 20 or 21 causes a force to be applied to piston 36 or 37, depending upon the direction in which the rudder was moved, urging it inwardly towards the retracted position shown in the drawing. So long as both rollers 18 and 19 are seated in lower level cam surface 16, rudder 2 is locked in position and can only be rotated by actuation of lever member 22 through a force applied thereto by the control surface actuating cable assembly 4.

While the automatic locking device has been described in connection with a rudder actuating system on an aircraft, it is obvious that the device is equally as useful in other applications where remote control of a swinging panel is desired. It is, therefore, to be understood that certain alterations, modifications and substitutions such as is mentioned above may be made to the instant disclosure without departing from the spirit and scope of this invention, as defined by the appended claims.

I claim:

1. An automatic control surface lock device for aircraft having a control surface swingable about a longitudinal hinge line and remote actuating means therefor comprising, cam means fixedly secured to said control surface, a roller lock arm swingably carried by the control surface supporting structure and arranged to engage said cam means for locking said control surface in the neutral position, lever means carried by the control surface supporting structure for swinging movement relative to the control surface about an axis generally parallel to said hinge line, said cam means having an opening formed therein, a pin carried by said lever means and projecting through said opening to allow only limited relative movement between said lever means and said cam means, piston 36 means carried by said cam means, and a bellcrank-like member swingably carried by said cam means responsive to said limited relative movement of said lever means in either direction for actuating said piston means and releasing said roller lock arm whereby said control surface may move about its hinge line in response to continued rotation of said lever means.

2. An automatic control surface lock device for aircraft having a control surface swingable about a longitudinal hinge line and remote actuating means therefor comprising, double cam means fixedly carried by said control surface, a pair of roller lock arms swingably carried by the aircraft control surface supporting structure, spring means urging said roller lock arms into engagement with said cam means for locking said control surface in a neutral position and against movement in either direction, a lever swingably carried by the control surface for movement relative thereto about an axis generally parallel with the hinge line and operatively connecting with the remote actuating means for controlled swinging movement in response to operation of said actuating means, an opening formed in said cam means, a pin carried by said lever and arranged to project loosely through said opening for allowing only limited movement of the lever relative to said cam means, a pair of roller lock release pistons carried by said cam means for limited axial movement relative thereto, and a bellcrank carried by said cam means and engaging said pin for swinging movement relative to said cam means within the limits defined by said opening in response to movement of said lever, said bellcrank being arranged to engage either of said pistons in response to swinging movement of said lever relative to said cam means for releasing said roller-lock arms and allowing movement of said control surface in response to continued rotation of said lever means.

3. In an aircraft having an aerodynamic control surface swingable about a hinge line and cable means for positioning said control surface, an automatic locking device comprising; a double cam member fixedly secured to said control surface, spring loaded arms swingably carried by the aircraft control surface supporting structure and arranged to engage said cam member and releasably lock said control surface in a neutral position, lever means carried by the aircraft adjacent said cam for swinging movement about an axis generally parallel with said hinge line and relative to said cam member, said lever means connecting with the cable means for controlled movement in response to actuation of the latter, said cam member having an opening formed therein, a pin carried by said lever means and projecting through said opening and limiting the relative movement between said cam member and said lever means, a bellcrank carried by said cam means and engaging said pin for swinging movement relative to said cam means within the limits defined by said opening in response to movement of said lever means, and axially movable pistons carried by said cam means and arranged to be pushed by said bellcrank into contact with said arms for releasing said cam means and allowing movement of said control surface through continued relation of said lever means.

4. An automatic locking device for aircraft and the like having a movable panel adapted to swing about a hinge axis on either side of a neutral position comprising; a circular cam member fixedly secured to said panel and having a symmetrically shaped recess formed therein, a pair of arms swingably carried by the panel supporting structure, rollers carried by said arms and arranged to seat within said recess for positively locking said panel in the neutral position, lever means carried by said panel adjacent said cam member for swinging movement relative thereto about an axis generally parallel with said hinge axis, bellcrank means pivotally carried by said cam member, pin means operatively connecting said bellcrank means with said lever means and allowing only limited relative movement between said cam member and said lever means, and piston means carried by said cam member and being responsive to movement of said bellcrank relative to the cam member for unseating said rollers and allowing continued movement of said lever means for swinging said panel.

5. An automatic locking device for aircraft and the like having a movable panel adapted to swing about a hinge axis on either side of a neutral position comprising; a cam member fixedly secured to said panel and having a recess formed therein between symmetrically arranged cam surfaces, roller lock means swingably carried by the panel supporting structure and arranged to seat within said recess and positively lock said panel in a neutral position, a spring engaging said roller lock means and urging the same towards said cam member, lever means carried by said panel for swinging movement relative thereto, finger means carried by said lever means and forming a lost motion connection with said cam member for limiting the relative movement between said cam member and the lever means whereby rotation of said lever means beyond that allowed by the lost motion connection is effective to rotate said panel, and roller lock release means carried by said cam member and engaging said finger means whereby relative movement between said lever means and the cam member is effective to release said roller lock means and allow panel movement.

6. An automatic locking device for aircraft and the like having a movable panel adapted to swing about a hinge axis from a neutral position only in response to remote control forces applied thereto comprising; panel supporting structure, a panel swingably carried by said supporting structure, a post secured to said panel and extending outwardly from the panel in a direction generally parallel with the panel hinge axis, a cam member fixedly secured to said post and extending laterally therefrom, roller lock means carried by the panel supporting structure for swinging movement about an axis displaced from said post and arranged to engage only said cam member to positively lock said panel in a neutral position, lever means carried by said post for swinging movement relative to said cam member, roller lock release means carried by said cam member and responsive to relative movement between said lever means and the cam member in either direction from said neutral position for actuating said roller lock means and releasing said cam member, a lost motion connection between said lever means and said cam member whereby said cam member and panel may be rotated by continued movement of said lever means beyond the limits defined by the lost motion connection, and spring means acting on said roller lock means urging the same against said cam member and effecting automatic locking of the device in response to return movement of said lever means back to the neutral position.

7. An automatic locking device for use with remote control systems of the type employed to control the movement of a hinged panel such as an aircraft control surface comprising; panel supporting structure, a panel carried by said supporting structure for swinging movement relative to a neutral position, a cam member fixedly secured to said panel and extending in a direction normal to the axis of panel rotation, an arm swingably carried at one end by the panel supporting structure, a roller carried by the free end of said arm and arranged to engage only said cam member to lock said panel in a neutral position, a control lever carried by said panel for rotation relative thereto, said lever having means limiting the rotation thereof relative to said cam member, roller release means carried by said cam member and responsive to relative movement between said control lever and the cam member for engaging said arm and automatically releasing the roller whereby rotation of said panel may be effected by continued rotation of said lever, and spring means engaging said arm and urging the roller against said cam means for automatically restoring said device to the locked condition.

8. An automatic locking device for use with remote control systems of the type employed to control the movement of a hinged panel such as an aircraft control surface comprising, panel supporting structure, a panel carried by said supporting structure for swinging movement relative to a neutral position, a cam member fixedly secured to said panel and having a recess formed therein, an arm swingably carried at one end of the panel supporting structure, a roller carried by said arm adjacent the opposite end thereof and adapted to ride on said cam member and seat in said recess for positively locking said panel in the neutral position, a control lever carried by said panel adjacent said cam member for limited rotational movement relative thereto, piston means slidably carried by said cam member out of the path of said roller and being responsive to relative motion between said lever and the cam member for forced movement from a retracted position to an extended position, a detent carried by said arm and arranged to engage said piston for unseating said roller in response to movement of said piston to the extended position whereby rotation of said panel may be effected by continued rotation of said control lever, and spring means acting between said panel supporting structure and said arm and urging the latter towards said cam member of restoring said device to the locked condition.

References Cited in the file of this patent

UNITED STATES PATENTS

| | | |
|---|---|---|
| 547,317 | Azzeroni | Oct. 1, 1895 |
| 2,203,396 | Sterhardt | June 4, 1940 |
| 2,406,233 | Linnert | Aug. 20, 1946 |
| 2,604,792 | Jeffrey | July 29, 1952 |